United States Patent [19]
Brunner

[11] Patent Number: 5,355,310
[45] Date of Patent: Oct. 11, 1994

[54] METHOD FOR OPERATING A MEDICAL IMAGING APPARATUS USING AN IMPROVED FILTERED BACK-PROJECTION TECHNIQUE

[75] Inventor: Julius Brunner, Rueckersdorf, Fed. Rep. of Germany

[73] Assignee: Siemens Aktiengesellschaft, Munich, Fed. Rep. of Germany

[21] Appl. No.: 953,007

[22] Filed: Sep. 29, 1992

[30] Foreign Application Priority Data

Oct. 15, 1991 [DE] Fed. Rep. of Germany ....... 4134127

[51] Int. Cl.⁵ ............................................. G06F 15/42
[52] U.S. Cl. ............................................. 364/413.21
[58] Field of Search ...................... 364/413.21, 413.13; 128/660.07, 660.01

[56] References Cited

U.S. PATENT DOCUMENTS 4,707,786 11/1987 Dehner .

OTHER PUBLICATIONS

"Direct Fourier Reconstruction in Fan-Beam Tomography," Peng et al., IEEE Trans. on Med. Imag., vol. MI-6, No. 3, Sep. (1987) pp. 209-219.

Primary Examiner—Gail O. Hayes
Attorney, Agent, or Firm—Hill, Steadman & Simpson

[57] ABSTRACT

An improved filtered back-projection technique for operating a medical imaging apparatus as disclosed wherein image noise and artifacts are reduced. In the improved method, back-projection image contributions are obtained from regions which lie outside the primary examination region. Correction projections are produced from these outside regions. The image produced by back-projection of the correction projections in the examination region is subtracted from an original, uncorrected image. The integrations which are undertaken when producing the correction projections are made along respective straight lines which are also used to characterize the projection values in the original, uncorrected image.

1 Claim, 3 Drawing Sheets

METHOD FOR OPERATING A MEDICAL IMAGING APPARATUS USING AN IMPROVED FILTERED BACK-PROJECTION TECHNIQUE

BACKGROUND OF THE INVENTION

1. Field of the Invention

The present invention is directed to a method for operating a medical imaging apparatus, and in particular to an improvement in the filtered back-projection method for producing such an image.

2. Description of the Prior Art

A typical computer tomography apparatus includes a measuring unit having an x-ray source and a radiation receiver. The receiver is composed of a row in individual detector elements, and the x-ray source emits a fan-shaped x-ray beam which, after passing through an examination subject, is incident on the radiation receiver. Each individual detector of the radiation receiver generates an electrical signal corresponding to the intensity of the radiation incident thereon. Means are provided for rotating the x-ray beam around the examination subject for transirradiation of a slice of the examination subject from different directions in the fan plane. A measured value processing unit is supplied with the signals from the individual detectors, obtained at the various transirradiation directions, identifies the attenuation values of predetermined points in the transirradiated plane of the examination subject from those signals. An image reproduction system generates a visual image from the calculated attenuation values. A processing unit undertakes a convolution or filtering of the measured data obtained from the detector signals, and generates a back-projection.

In a medical imaging apparatus of this type, for generating an image of a slice of the examination subject, a defined characteristic ($\hat{r}$) of the examination subject is approximated and visually displayed for each location $\hat{r}$ in the slice plane through the subject. For that purpose, measured data are acquired corresponding to the integrals of ($\hat{r}$) along a series of lines in the slice plane. The lines $L(\gamma, \delta)$ are characterized by two parameters, as are the corresponding measured values $f(\gamma, \delta)$, according to the relationship:

$$f(\gamma, \delta) = \int_{L(\gamma, \delta)} O(\hat{r}) ds$$

wherein ds is an element of the line $L(\gamma, \delta)$.

In parallel ray tomography devices, $\delta$ is the distance of the line $L(\gamma, \delta)$ from the center of the device and $\gamma$ is the angle between the normal proceeding through the center on the line $L(\gamma, \delta)$ and a fixed reference direction. In fan beam machines, $\gamma$ is the angle which the straight line between the tip of the fan and the center of the measuring system (i.e., the central ray) describes relative to a reference line, and $\delta$ is the angle between the central ray of the x-ray beam and the ray under consideration.

In an medical imaging apparatus of the type described above, operating according to known back-projection techniques, the image contains artifacts which are based on statistical unreliabilities of the measured values, and on deterministic measured value errors, such as calibration errors and linearity errors.

SUMMARY OF THE INVENTION

It is an object of the present invention to provide an improved method for operating a medical imaging apparatus based on the filtered back-projection technique, wherein the image quality is improved in comparison to the image obtained by standard back-projection methods, by reducing image artifacts and noise.

The above object is achieved in accordance with the principles of the present invention in a method wherein back-projection contributions are also identified in regions which lie outside the primary examination region, i.e., the subject region, and correction projections are produced from these outside regions. The image generated by back-projection of the correction projections in the region of the subject is subtracted from the originally generated (uncorrected) image. For generating the correction projections, integrations are made along the same straight lines which were used to characterize the original projection values.

DESCRIPTION OF THE PREFERRED EMBODIMENTS

Figure 1:
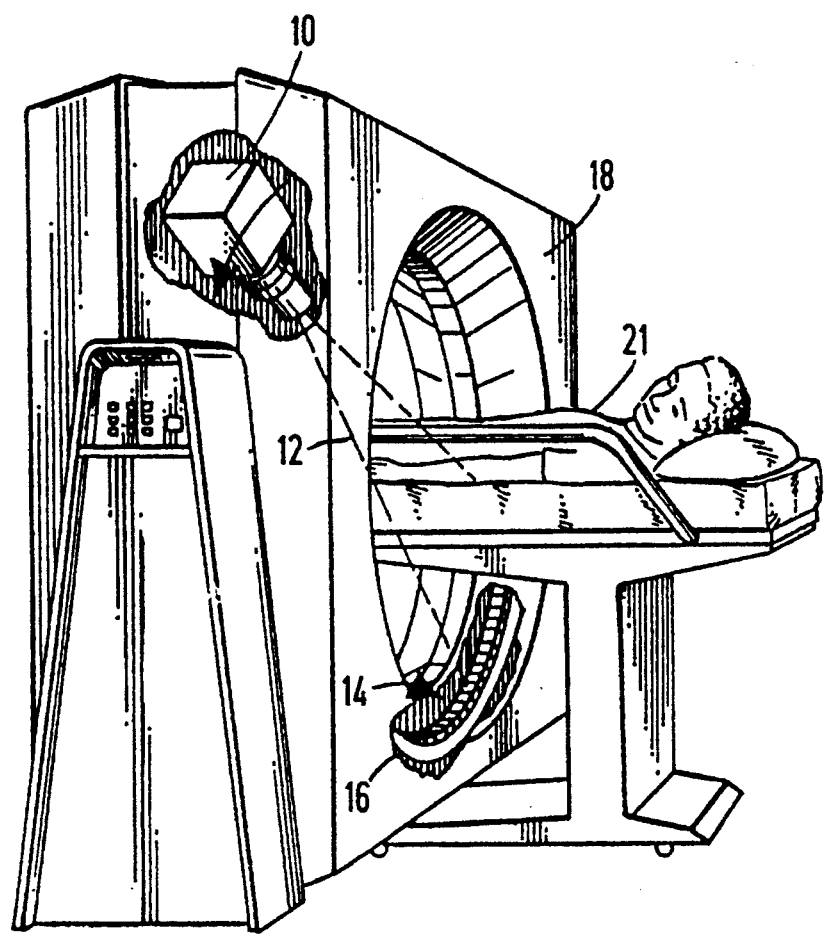
FIG. 1 is a side view showing the mechanical components of a computer tomography apparatus, operable in accordance with the principles of the present invention.
Figure 2:
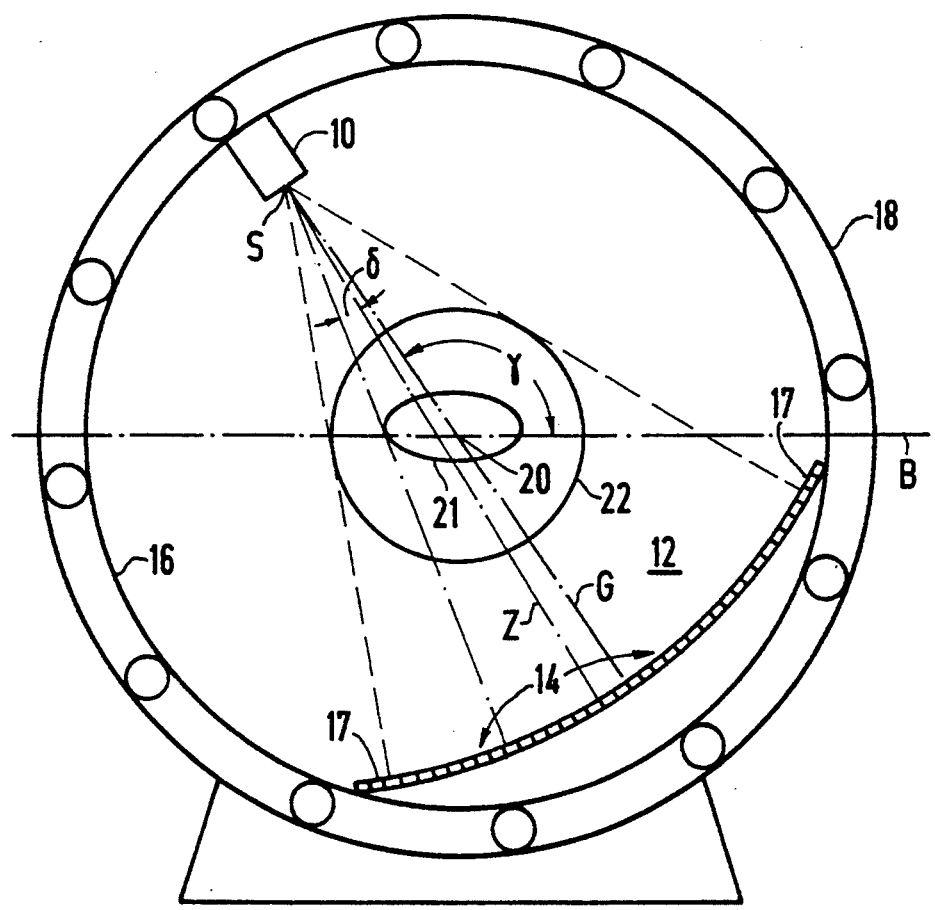
FIG. 2 is a schematic, end elevational view of the apparatus of FIG. 1.

The invention will be explained with reference to a computer tomography apparatus operating with a fan beam. As shown in FIGS. 1 and 2, an x-ray radiator 10, or some other radiation source, generates a fan-shaped x-ray beam 12 which is incident on a detector array 14. The detector array 14 is composed of a plurality of individual detector elements arranged in a row. The detector elements are disposed on a circle having a center disposed in the x-ray radiator 10. in a preferred embodiment, 512 individual detector elements are used, which in combination generate the data for forming the ultimate image. Four monitor detectors 17 are also provided, two of the monitor detectors 17 being disposed at each end of the detector array 14. These monitor detectors 17 receive radiation from the x-ray radiator 10 which is unattenuated by the examination subject, in a manner described in greater detail below.

The x-ray radiator 10 and the detector array 14 are arranged on an inner ring 16 of a frame structure, so that the x-ray radiator 10 and the detector array 14 are held in a fixed relationship to each other. The inner ring 16 is rotatable within an outer ring 18, so that the inner ring 16, together with the x-ray radiator 10 and the detector array 14, can be rotated around an axis 20 extending perpendicularly to the plane of the fan-shaped x-ray beam 12. The fan-shaped x-ray beam 12 transirradiates a circular region, which is defined by a circle 22, as the inner ring 16 of the frame is rotated through 360°, thereby causing the transirradiation angle to change during rotation of the x-ray radiator 10 and of the detector array 14.

An examination subject, such as a body 21, which is to be scanned is disposed in the circle 22, and the x-rays which penetrate the circle 22 are incident on the detectors of the detector array 14. The monitor detectors 17 are disposed so that x-rays incident on those detectors proceed outside the circle 22. In this manner, the x-rays which are incident on the monitor detectors 17 provide information about the x-ray intensity of the x-ray radiator 10 for each projection.

The transirradiation angle of the x-ray radiator 10 in the circle 22, relative to the stationary body 21 is called the projection angle. A tomographic scanning of a patient or some other subject disposed in the circle 22 is undertaken by registering the data of the detectors of the detector array 14 from a plurality of different projection angles, and a calculated image is obtained by processing the data from the detectors, the image being representative of the density of the patient or some other subject, in the cross-sectional region disposed in the plane of the fan-shaped x-ray beam 12.

The above-described method is repeatedly undertaken during rotation of the x-ray radiator 10 and the detector array 14 around the stationary patient 21. In the described embodiment, the ring 16 makes a complete revolution in approximately one second. One projection of the subject slice to be measured is made for each degree of the rotation, so that 360 separate sets, each having 512 data entries, are produced in one scan. The data are processed in the manner described above to produce the ultimate visual image.

Figure 3:
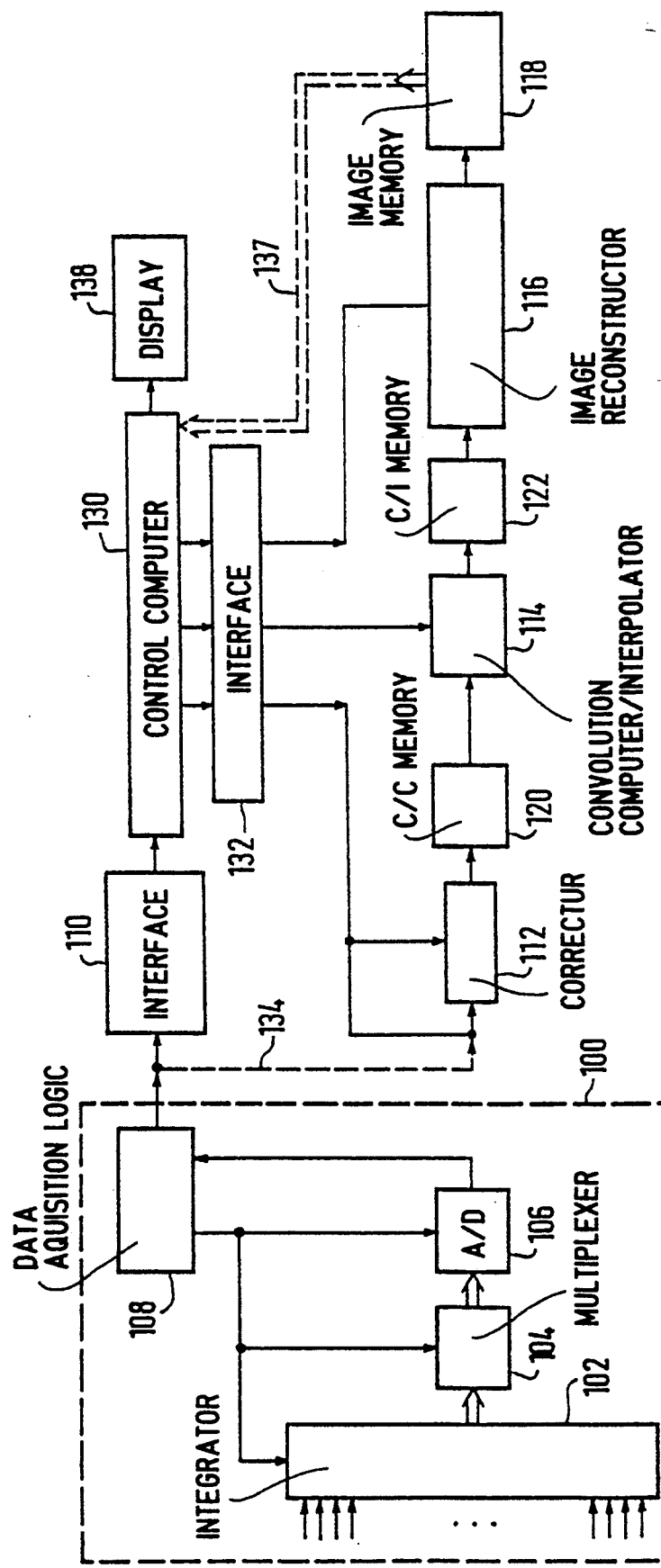
FIG. 3 is a block circuit diagram of the processing components for a computer tomograph apparatus operating in accordance with the principles of the present invention.

In accordance with the principles of the present invention, as shown in FIG. 3, an improvement in the image quality is obtained using processing electronics divided into two sections. The first section contains the data acquisition electronics and is arranged on the ring 16, so that it rotates together with the detector array 14 and the x-ray radiator 10. The other section contains the processing electronics, which is stationary and is not arranged on the ring 16. The data acquisition electronics are contained within the dashed line 100 in FIG. 3, and should be disposed as closely as possible to the detector array 14 in order to maintain noise signals and other noise sources as low as possible.

The output of each detector in the detector array 14 is conducted to an allocated integrator stage in an integrator unit 102. The integrator unit 102 thus contains 512 detector integrator stages and 4 monitor detector integrator stages in the preferred embodiment. The outputs of the integrator stages of the integrator unit 102 are supplied to a multi-channel analog multiplexer 104. The multiplexer 104 selectively connects the outputs of the integrator stages to a logarithmic analog-to-digital converter 106.

The integrator unit 102, the multiplexer 104 and the analog-to-digital converter 106 are controlled by signals from data acquisition logic 108. The digital data from the converter 106, which represent the detector output signals, are supplied to the logic 108, which transmits these data via a cable connecting the frame electronics within the region 100 to the remaining components of the tomography processing equipment.

After the data from each detector element have been converted into digital form and transmitted, the various operations which must be implemented with these data in order to form the ultimate image are undertaken in a high-speed pipeline processor. The pipeline processor is composed of four functional units: a corrector 112, a convolution computer/interpolator 114, an image reconstruction computer 116 and an image memory 118. Some of these units may themselves have an internal pipeline processing configuration. By step-by-step execution of the required calculating operations in each of the pipeline units, the processor can execute its functions within the time required for the data acquisition.

In the illustrated embodiment, data from the region 100 are supplied to the frame/computer interface 110. This interface checks the data from the region 100 with respect to format, and stores the data in the memory of a control computer 130 with direct memory access (DMA). When the corrector 112 is prepared to receive new data, the data are supplied to the corrector 112 from the control computer 130 via the computer/processor interface 132, and are stored in the corrector 112 for the processing. The data transfer from the region 100 to the corrector 112 ensues via the control computer 130 in order to facilitate the storage of raw data, when desirable, and in order to allow calibration corrections to be implemented by the control computer 130 according to calibration data, as described below. In other types of installations, wherein it may be undesirable for the data from the region 100 to pass through the memory of the control computer 130, the data from the region 100 can be directly supplied to the corrector 112.

The data supplied to the corrector 112 are composed of digital values which are representative of the logarithm of the detector output signals. The corrector 112 undertakes a number of different operations using this data. In order to compensate variations in the detector sensitivity and channel gain, offsets in the electronics, and variations in the x-ray intensity from projection to projection, data without a subject between the x-ray radiator 10 and detector array 14 are registered. From these data, the control computer 130 calculates calibration values which are stored, and which are later supplied to the corrector 112 via the interface circuit 132. The detector output data are not a linear function of the density of the body through which the x-rays pass, due to the ray hardening effect. A hardening correction is therefore also implemented by the corrector 112. Finally, the corrected signals are multiplied by the cosine of the angle between the specific individual detector, which supplied the signal in question, and the central detector. This is required because of the mathematical function which allocates the measured data to the ultimate image.

The corrected data are stored in the C/C memory 120. The data for one projection, after the data have been corrected and stored in the C/C memory 120, are accessible for processing in the convolution computer 114. The convolution computer 114 "folds" the series of corrected input data with a function that eliminates smearing in order to edit the data for the back-projection. The convolution function can be varied by the operating personnel, dependent on the characteristics which is desired that the ultimate image have. To this end, a plurality of convolution functions are stored in the control computer 130. Dependent on the selection of one of these functions by the operating personnel, the control computer 130 transmits data which are representative of this function to the convolution computer 114 via the interface circuit 132. This ensues before the beginning of a tomographic scanning. The convolution function which eliminates smearing, and which is transmitted from the control computer 130 to the convolution computer 114, is composed of 512 words of 24 bits each.

The output signal of the convolution computer 114 is composed of 512 data points. The interpolation stage of the convolution computer 114 accepts this information and supplies 8 points of interpolated data from each of the 512 data points. This ensues with 7 additional data points for each of the original data points. These additional data points are calculated using a linear interpolation between each of the original data points. The convoluted and interpolated data are stored in the C/I memory 122, where the data are available for the image reconstructor 116, which back-projects the data from each of the exposures into the image memory 118, in order to form the ultimate image. In accordance with the principles of the present invention, a back-projection method using a high-speed pipeline processor can execute the back-projection calculations in an extremely short time, so that the ultimate, visible image is present immediately after a scan event. The image reconstructor 116 requires that certain constants be stored or calculated before implementing the image reconstruction calculations for each scan. Typically, these projection constants are stored in the control computer 130, or are calculated by the control computer 130, and are then transmitted to the image reconstructor 116.

During this back-projection, the image reconstructor 116 defines corresponding data for each of the points in the 512×512 image matrix, and multiplies them by a weighting function. The output signal of the image reconstructor 116 for each projection is composed of the same number of values as there are image points. These values are added to the data which were previously stored in the image store 118. The image memory 118 contains 512×512 words of 16 bits each. After a scan has ended, the data stored in the image memory 118 are representative of the density of the cross-sectional region which was scanned.

The image data from the image memory 118 can be displayed in various ways. In a preferred embodiment, the data are read by the control computer 130, as indicated by the dashed line 137, so that certain functions using these data can be executed by the control computer 130, for example making the range of dynamics of the grayscale in the image smaller or larger. The control computer 130 then supplies the processed data to an image monitor 138.

The transfer of data between the corrector 112, the convolution computer/interpolator 114 and the image reconstructor 116 of the pipeline processor takes place using two two-bank memories. The correction convolution computer memory, or C/C memory 120, is disposed between the corrector 112 and the convolution computer/interpolator 114. When the corrector 112 enters corrected data for a projection into one bank of the C/C memory 120, the convolution computer 114 reads the data of the previous projection out of the other bank of the C/C memory 120. Thus, 512 words of 15 bits each are entered into a bank of the C/C memory 120, or are read from a bank thereof, during each scan. The convolution computer/image reconstructor memory, or C/I memory 122, is connected between the convolution computer/interpolator 114 and the image reconstructor 116. The C/I memory 122 is a two-bank memory similar to the C/C memory 120. The interpolator stage of the convolution computer/interpolator 114 produces 8 intermediate values for each convoluted data point, with the 18 most significant bits of the result of each convolution and interpolation are retained. In this manner, 4,096 words of 16 bits each are written into each of the two memory banks of the C/I memory 112, and are read out therefrom during each projection.

In FIG. 2, $\gamma$ is the angle which the straight line Z, proceeding between the fan tip S and the axis 20 of the measurement system (i.e., the central ray) describes with respect to a reference line B, and $\delta$ is the angle between the central ray Z of the x-ray beam 12 and the ray S under consideration.

The quantity of measured data for a specific $\gamma$ is referred to as a projection. Of course, such projections can only be defined for specific $\gamma_i(i=1,2,\ldots)$. Within each projection, actual measured values are obtained for $\delta_k = \delta_o + K \cdot \Delta (k=1,2,\ldots$ and $\Delta$ is the angle between two individual detector elements). After the execution of a discrete convolution within each projection, and an interpolation between the convolution results at the locations $\delta_k$, convoluted projections $$P_i(\delta) = \sum_k P_i(\delta_k) \cdot h(\delta - \delta_k),$$

are obtained, wherein $h(\delta)$ is the interpolation function. The image referred to herein as the original image (i.e., an uncorrected image) is obtained by back-projection of the summed projections represented by $P_i(\delta)$.

In accordance with the principles of the present invention, back-projection contributions are also calculated for image regions lying outside the primary examination region, i.e., outside the circle 11. After addition of the contributions of all projections the values in the outside region would be zero if the projections would not contain errors. Due to the statistical unreliability of the measured values (noise) and due to deterministic measured value errors (calibration errors, linearity errors), the projections $P_i(\delta_k)$ contain certain components which lead to image contributions in the outside region. In accordance with the inventive method, correction projections $$K_i(\delta) = \sum_k K_i(\delta_k) \cdot h(\delta - \delta_k)$$

are generated and the factors $K_i(\delta_k)$ required for that purpose are produced by integration of the image values in the outside region along the same straight lines defined by $\gamma_i$ and $\delta_k$ with, if necessary, the use of a location-dependent weighting factor. A location-dependent weighting factor is not necessary in parallel ray systems; in fanned ray systems, however, a weighting factor can be used which is proportional to the square of the distance between the image point and the fan tip. The image produced by back-projection of the correction projections in the region of the subject is, in accordance with the principles of the present invention, subtracted from the aforementioned original image. The corrected image which is obtained in this manner has less noise, and the strength of the artifacts which arose in the original image due to deterministic measured value errors is reduced.

Although modifications and changes may be suggested by those skilled in the art, it is the intention of the inventor to embody within the patent warranted hereon all changes and modifications as reasonably and properly come within the scope of his contribution to the art.

I claim as my invention

1. In a method for operating a medical imaging apparatus wherein an original image of an examination subject in a subject region is produced by back-projection, with projection values for the back-projection being obtained along a plurality of defined straight lines, the improvement comprising:

identifying back-projection contributions in regions outside said subject region;

producing correction projections from said contributions which respectively include integration along said straight lines used to obtain the projection values for said original image;

producing a further back-projection in said subject region which includes said correction projections; and subtracting the image generated by said further back-projection from the original image to obtain a corrected image.

* * * * *